(12) United States Patent
Mohammed et al.

(10) Patent No.: US 8,837,370 B2
(45) Date of Patent: Sep. 16, 2014

(54) SYSTEM AND METHOD FOR CONNECTING, CONFIGURING AND TESTING WIRELESS DEVICES AND APPLICATIONS

(75) Inventors: Jahangir Mohammed, Saratoga, CA (US); Daniel Collins, McKinney, TX (US); Amit Gupta, Livermore, CA (US); Macario Namie, San Francisco, CA (US); Terrence Poon, Fremont, CA (US); Scott Potter, Los Gatos, CA (US); Curtis Govan, McKinney, TX (US)

(73) Assignee: Jasper Technologies Inc., Mountain View, CA (US)

( * ) Notice: Subject to any disclaimer, the term of this patent is extended or adjusted under 35 U.S.C. 154(b) by 224 days.

(21) Appl. No.: 13/544,497

(22) Filed: Jul. 9, 2012

(65) Prior Publication Data

US 2013/0176940 A1  Jul. 11, 2013

Related U.S. Application Data

(60) Provisional application No. 61/505,951, filed on Jul. 8, 2011.

(51) Int. Cl.
*H04W 24/00* (2009.01)
*H04W 4/00* (2009.01)

(52) U.S. Cl.
CPC .............. *H04W 4/005* (2013.01); *H04W 24/00* (2013.01)
USPC ........................................... 370/328; 455/511

(58) Field of Classification Search
CPC .............................. H04W 24/00; H04W 84/12
USPC ........................................... 370/328; 455/511
See application file for complete search history.

(56) References Cited

U.S. PATENT DOCUMENTS

2004/0260752 A1* 12/2004 Chandra et al. ................ 709/200
2006/0035631 A1*  2/2006 White et al. ................... 455/418

\* cited by examiner

*Primary Examiner* — Dang Ton
*Assistant Examiner* — Mewale Ambaye
(74) *Attorney, Agent, or Firm* — Blakely Sokoloff Taylor & Zafman, LLP

(57) ABSTRACT

A system, apparatus, and method are provided for connecting, configuring and testing wireless devices and applications. For example, one embodiment of wireless device for operation in a wireless network comprises a processor, a wireless module including a radio receiver and transmitter unit coupled to the processor, a graphical user interface (GUI) coupled to the processor, and a Connection Manager Module (CMM) including an Application Programming Interface (API) module, a Rules Engine Module, and a Rules Set Module, wherein the CMM manages a connection to a wireless network.

2 Claims, 16 Drawing Sheets

Your Device Info

Module you are using in your device
MC 8775 PCI Express Mini Card -- Qualcomm/MSM6280/1.1.9.33 ▸ — 601

Note: You must be using an AT&T certified module or device with appropriate chipset and firmware. See list
Not certified or simply not sure? Please contact us at DevKit@ATT.m2m.com

Contact Information — 602

First Name
Tom

Last Name
Webster

Phone Number (enter without spaces)
408-720-8301

Email
thomas_webster@bstq.com

Company Name
Blakely, et al

Launch Timeframe
Within 3 months ▸

Type of device you are developing
Computing ▸

Devices expected to deploy first year
25

Enter number, no commas

Account Information — 603

User Name
tomwebster

Password
••••••

6-25 letters and/or numbers, no spaces 6-25 characters, any combination of
letters/numbers/symbols, no space Confirm Password
••••••

FIG. 6A

☐ Referral Code ← 604

Enter your referral code (optional)
[100SARA]  [Enter]

☐ Payment Information ← 605

Cardholder First Name
[Tom]

Cardholder Last Name
[Webster]

Card Number (enter without spaces)
[480801170021*****]

Security Code
[700           *****]

Expiration
[January ▾] [2013 ▾]

☐ Billing Information ← 606

Street Address
[1279 Oakmead Pkwy]

Street Address 2
[ ]

City / Town
[Sunnyvale]

State
[California ▾]

Zip Code
[95032]

Country
(Sorry, Service is only available in the US)
[United States ▾]

☐ Shipping Information ← 607

Shipping Method
☑ Ship to Billing Address (NOTE: Shipper cannot deliver to a PO Box).
[Continue]

| Home | Terminals | Billing | Orders | Coverage | Admin | Alerts | Support | Internal | Sales Management | User Profile | Extended Access | Help | Log Out |

Sales Dashboard — 801

Account [ ] Search Clear Advanced ▼

| | ID ▲ | Account | Qualification State | Industry | Devices | Live Updates: On | Turn Off | Launch Time Frame | Expected Deployment | 1-3 of 3 | Referral Code |
|---|---|---|---|---|---|---|---|---|---|---|---|
| ☐ | 1 | Jasper Systems | Qualified | boating | cell phone | | | soon | 100 subs | | 1234 |
| ☐ | 3 | 01 Test Account | Needs Further Qualification | ships | cell phone | | | never | 5 subs | | 1234 |
| ☐ | 5 | Shelly Test1 - ravi6 | Needs Further Qualification | Retail Electronics | | | | 6-12 months | 20000 | | 123 |

802 — Edit

Done

FIG. 8

SYSTEM AND METHOD FOR CONNECTING, CONFIGURING AND TESTING WIRELESS DEVICES AND APPLICATIONS

CROSS-REFERENCE TO RELATED APPLICATIONS

This application is based upon and claims the benefit of priority for prior Provisional Patent Application No. 61/505,951, filed on Jul. 8, 2011, the entire contents of which are incorporated herein by reference.

BACKGROUND

1. Field of the Invention

This invention relates generally to the field of wireless network systems. More particularly, the invention relates to an improved architecture and method for connecting, configuring and testing wireless devices including Machine-to-Machine ("M2M") devices and applications.

2. Description of the Related Art

Unlike mobile phones, the primary purpose of a connected "Machine-to-Machine" (hereinafter "M2M") device is not wireless communications per se. Rather, wireless communication enhances the M2M devices. For example, connected navigation devices are firstly navigation devices, but are enhanced by being connected; a security system is not designed primarily for wireless communications, but is greatly enhanced by wireless connectivity, etc. This means that, unlike wireless phones, a developer of a M2M connected device may not be principally a communications expert, rather he or she may be an expert of the M2M device application. However, M2M device application software needs to drive the wireless communications as well. In essence, the M2M device developer needs wireless communications expertise.

Many M2M connected devices tend to be specialized for a particular application. At first glance, this may appear to simplify the wireless communications requirements. For example, some M2M connected devices may not need to support voice. However, the opposite is often true, M2M connected devices have more complex communications requirements. Unlike wireless phones, most emerging M2M connected devices do not have a human in charge of communication i.e., deciding when and how to connect, which operator to use, how to handle problems such as poor coverage, etc. Instead, the wireless communications of M2M connected devices must happen automatically, reliably and economically despite network issues or coverage issue. In the absence of direct human control, these communications requirements must be met by the M2M device communications software.

Virtually all wireless carriers today offer both voice and data services. FIG. 10 illustrates a high level architecture of a wireless service provider 110 communicating with one wireless device 101 using both voice and data channels and communicating with a second wireless device 103 using only a data channel. By way of example, many wireless carriers employ the Global System for Mobile Communications ("GSM") standard to support voice traffic and the General Packet Radio Service ("GPRS") standard to support data traffic over the same wireless network. In such a configuration, voice logic and circuitry 112 shown in FIG. 10 processes the GSM voice traffic and separate data logic and circuitry 111 processes the GPRS data traffic. While some of the embodiments of the invention described below implement the GPRS standard for data services and GSM for voice services, it should be noted that the underlying principles of the present invention are not limited to any particular wireless network protocol.

Using the data channel, wireless devices 101, 103 communicate with external servers 131 such as Web servers, instant messaging servers and email servers via the Internet 120 (or other packet-based data network). One particular type of wireless device 103 configured for data traffic is the M2M device. M2M devices are deployed in application-specific telemetry systems to collect data using sensors and transmit the data to a destination such as a server accessible over the Internet (or other data network). In the past, telemetry systems were the exclusive domain of very large well financed organizations. For example, large oil and gas companies and electric utilities, through the use of custom-built, proprietary data networks, were some of the first private organizations to use telemetry. In recent years, however, the cost of access to public wireless data networks has dropped, opening the door for new, cost effective M2M applications including, for example, fleet management, point-of-sale transactions, consumer electronics, healthcare monitoring, security, and surveillance, to name a few.

Even with the decreased cost for wireless data communication, however, the process of M2M application development and onboarding remains complex, time-consuming and inefficient, requiring a significant amount of manual effort on the part of a prospective M2M application developer.

In order to develop such applications, the prospective M2M application developer may engage with the members of the sales team at the wireless service provider (typically cellular carriers or their resellers) and provide detailed plans, business projections, and technical details just to get started. Once the process is initiated, each step along the way may take a lengthy amount of time and manual effort on the part of multiple individuals inside the service provider organization. For example, it may require a significant amount of time to simply receive usable Subscriber Identity Modules ("SIMs") for testing purposes. Even after receiving usable SIMs from the service provider, the prospective M2M application developer still has the daunting task of designing the final product, and very little help is provided to iron out various defects/bugs introduced at this early stage.

Moreover, the sales team at the wireless service provider has very little, if any, visibility into how the prospective M2M application developer is progressing, often resulting in time wasted chasing poor-quality prospective M2M application developers. This process can take many months (typically between 6-18 months) and during this time, both the prospective M2M application developer and the service provider waste a lot of time and effort in these discussions.

Many wireless devices are built upon a communications module, or chipset and stack. The module is effectively a wireless modem that allows a device application to communicate over a wireless network through GPRS/EDGE/UMTS data, voice, circuit switched data, SMS, etc. The device application itself uses the module whenever it wishes to send or receive data through any of the bearers supported by the module. Most modules are controlled from the device application directly by AT commands (Hayes command set), with many standardized commands specified in 3GPP standards.

For example, there are commands to configure the module itself, commands to control which network to select, commands for configuring, setting up and tearing down data sessions, commands for short message handling, etc. In addition, most module vendors have proprietary AT commands. Moreover, each command has a set of possible errors that must be handled, plus there may be unsolicited notifications from the module to the software. Not only must the application developer be aware of the various commands and notifications, the application developer must have the expertise to apply the commands correctly and handle the notifications correctly. This may require the application developer to be skilled in wireless communications.

To make matters manageable, some module vendors implement a development environment and interface that shields the developer from the details of the wireless communications. This has the advantage that the application developer need not manage the various AT commands. However, it has the disadvantage that the module vendor needs to independently handle all the interactions with the wireless network. Unless the module vendor is also in control of the wireless service subscription and network, it is not feasible for the module to know how to handle the various real-world scenarios. For example, the module does not know which operators are the service provider's preferred roaming partners; the module does not know what the service provider requires for re-tries when communications do not work, the module does not know how to report network diagnostics to the network operator, etc.

Consequently, what is needed is a more efficient system and method which addresses the current inefficiencies associated with integrating wireless networks, M2M developers, wireless device developers, and wireless data applications. A solution may be to deploy a device middleware layer that works in concert with the network service provider, provides a simple interface to the application developer and manages the module or chipset/stack on behalf of the device application.

BRIEF DESCRIPTION OF THE DRAWINGS

A better understanding of the present invention can be obtained from the following detailed description in conjunction with the following drawings, in which:

FIGS. 6a-b illustrate one embodiment of a trial order Website for collecting user and device data for wireless trial devices.

FIGS. 7a-c illustrates one embodiment of a Web-based graphical user interface employed at a Control Center.

FIG. 8 illustrates one embodiment of a Web-based graphical user interface employed by a sales management system.

DETAILED DESCRIPTION OF PREFERRED EMBODIMENTS

Figure 1A:
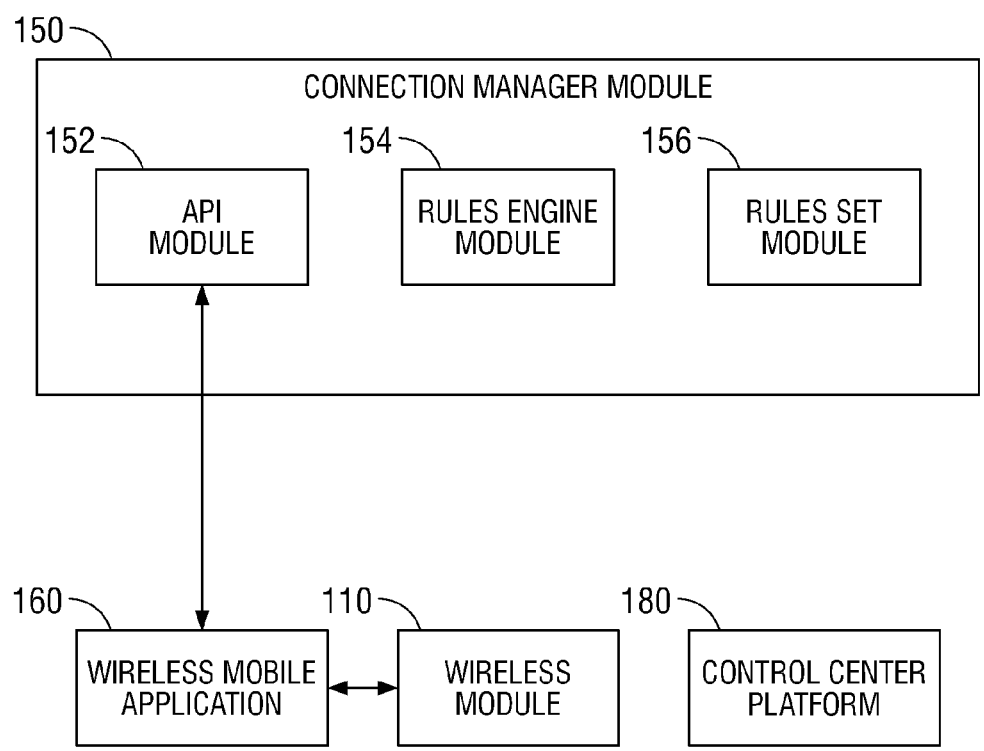
FIG. 1A illustrates a Connection Manager Module (CMM) comprising an Application Programming Interface (API) module, a Rules Engine Module, and a Rules Set Module according to an embodiment of the invention.

Described below is a system and method for designing and integrating new wireless data applications on a cellular network. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

The embodiments of the invention described below reduce the time, complexity, and cost associated with developing and deploying wireless device/applications, or more specifically, M2M wireless device/applications. In particular, in one embodiment, a wireless device/M2M device-based Connection Manager Module (CMM) (i.e. a wireless device/M2M device middleware layer) and method are employed with guides for quality design, efficient techniques for testing, configuring, and troubleshooting new and existing wireless device/M2M wireless device/applications. The CMM relieves the wireless device/M2M wireless device/application of the complete responsibility of managing the wireless module. In another embodiment, a wireless system is described for testing, configuring, and troubleshooting new and existing wireless device/M2M wireless device/applications that incorporates the wireless device/M2M device-based CMM in communication with a network server based Control Center (CC) platform. The CMM may act independently or in concert with the Control Center (CC) platform.

Various embodiments of the invention will refer to wireless devices, M2M wireless devices, cellular devices, USB wireless devices, mobile devices, etc. It will be apparent, however, to one skilled in the art that the invention may be practiced with any number of wireless or mobile devices. For example, a wireless or mobile device can be a cellular telephone, a smartphone with data transfer and messaging capability, a tablet computer, a personal digital assistant (PDA), a video-camera, a gaming device, a global positioning system (GPS), an e-Reader, a Machine-to-Machine (M2M) device (i.e., an application-specific telemetry device that collects data using sensors and transmits the data to a destination such as a server over a network), a hybrid device with a combination of any of the above functionalities, or any other wireless mobile devices capable of sending and receiving voice, data and text messages. Specific references may be made to M2M devices; however, the following discussion applies to all wireless/mobile devices.

Developing an efficient and robust wireless M2M device/application requires detailed and intimate knowledge of the wireless module or modem, AT commands (Hayes command set), network operations, and changing network conditions. The CMM may be embedded software that controls the wireless module/modem, ensures that a connection is established and maintained, enables external network-initiated connections, and provides remote control options and diagnostic functions (e.g. via an external Control Center platform). The use of CMM greatly simplifies the wireless connectivity portion of a M2M device/application development.

The CMM consists of platform-independent software and platform adaptation components. FIG. 1A illustrates the CMM 150 comprising an Application Programming Interface (API) module 152, a Rules Engine Module 154, and a Rules Set Module 156. Also shown are a wireless module/modem 110 and the Control Center Platform 180.

The API module 152 provides an interface to M2M device mobile application 160 that allows M2M developers to rapidly develop and deploy mobile applications without detailed knowledge of wireless networking or AT commands. Ultimately, this results in a faster time to market and a robust wireless solution.

The CMM 150 platform-independent software manages all communications utilizing the Rules Engine Module 154 which comprises a generic configurable state machine. The CMM 150 also utilizes the Rules Set Module 156 that provides connection logic that controls the wireless module/modem 110. Rules sets may be created, revised, updated, and tested and can be distributed remotely by various means, including generation and distribution by the Control Center platform 180.

The Rules Engine Module 154 including the configurable state machine may be configured by rules set files that direct the wireless module 110 in setting up and maintaining connections. Rules sets may be maintained and distributed from Control Center 180. Control Center 180 may create rules sets specific to each of the major wireless modules. Rules sets may also be obtained from alternative sources other than Control Center 180. A collection of rules in the rule set drives the state transitions either unconditionally or in response to events. Events are raised based on wireless module 110 responses, connectivity changes, and the action of various timers and counters defined in the rules set. Outputs specified on state transitions result in AT commands to drive the behaviour of the wireless module 110.

The state machine is defined by the rules set, which specifies the state transition rules, and the actions to be taken in the event of radio network errors. If desired, there can be different Rules Sets for different types of applications (e.g. stationary vs. mobile device, roaming vs. non-roaming device, etc.).

Figure 1B:
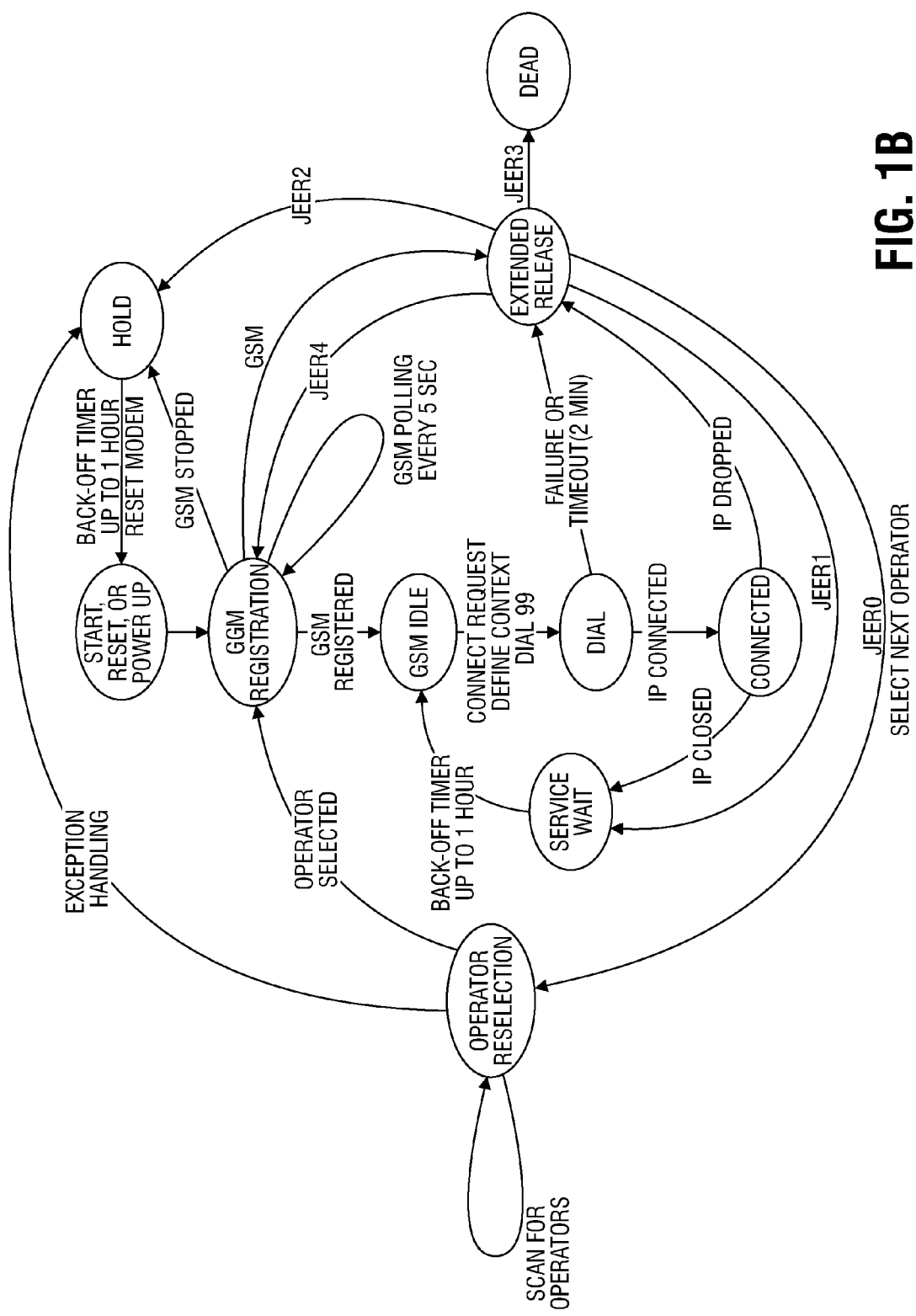
FIG. 1B illustrates a method for integrating the CMM with a M2M device application by utilizing the platform-independent CMM API according to an embodiment of the invention.

FIG. 1B illustrates an example rules set according to an embodiment of the invention. The rules set contain communications logic/flow including backoff logic. The rules set establishes network connections, interprets responses from the module/modem or network, eliminates aggressive wireless device behaviour, and may be module/modem specific.

As shown in FIG. 1B, the rules set is comprised of a collection of states, rules, timers and counters. The rules set is described by a binary file with a proprietary format. Rules sets may be very flexible and can define a wide range of logic to control the operation of the modem. There may be different strategies for managing the connectivity of a modem. For instance, one strategy might be to obtain a connection regardless of how long it takes. Another might be to obtain a connection as quickly as possible. Rules sets allow wide variation in the system logic to accommodate a large range of strategies.

States define arbitrary states in the rules engine that may represent system states. Each state is defined by a name that is referenced by rules. Events are created by modem responses or expiration of timers and counters. Modem responses can be either normal or error responses to AT commands.

Timers are started on events and expire after their timeout value, creating timeout events. Timers can be defined to operate with a "backoff" mechanism, wherein the timeout period may increase after each expiration. The utilization of timers may prevent "aggressive" behaviour of the system where operations are retried frequently, causing unnecessary network traffic. Another feature of the timers is randomization, where part of the timeout value can be a random value. The utilization of randomization may prevent a large number of devices from attempting operations on the network at the same time. In one embodiment, a formula for calculating the next expiration value, T2, from the current value, T1 is:

$$T2 = C + n*T1$$

Where C is a constant and n is a multiplier. If n is a positive value, the current timeout value is multiplied by n and added to C. If n is a negative number, a random value between 0 and the absolute value of n is calculated.

Counters count events that occur in the system to allow the rules set logic to take action after a fixed number of events.

Rules define the transition from one state to another. They are triggered by events and create outputs on the transitions. These outputs can be modem commands, or starting or cancelling timers or counters. As the logic transitions from state to state within the rules set, the outputs' drive the modem to perform the actions that affect modem connectivity.

The CMM and rules set are flexible in terms of how they handle the different radio network error and reject codes. For example, an event handled by the rules set may be a situation where the wireless device, while involved in or attempting a data session, receives a packet data protocol (PDP) reject cause code 33 and the CMM continues to receive PDP activation requests from the upper device application layer. CMM can back-off and retry on the same carrier, back-off then reset the module, attempt to connect on another carrier or stop attempting.

In another example, if the wireless device receives a GPRS attach reject with cause code 17, the CMM/rules set will instruct the modem to attempt to connect on another carrier (e.g. roaming partner).

Control Center 180 has the ability to "push" rule set files to M2M devices on the network. Control Center 180 may initiate this function by sending an SMS message to CMM 150. Upon receiving the message, CMM 150 establishes an IP connection via the wireless data network, retrieves the specified rules set, and disconnects. CMM 150 may utilize a command channel for such communication. CMM 150 may then restart/reboot using the new rules set. If CMM 150 encounters any errors in loading the new rules set, CMM 150 may revert to the last known good rules set.

Figure 1C:
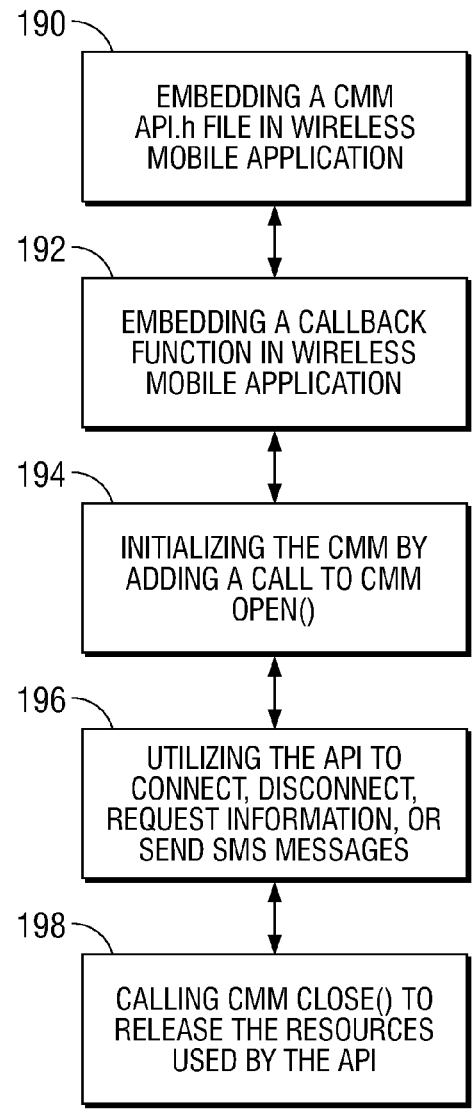
FIG. 1C illustrates an example rules set according to an embodiment of the invention.

The CMM 150 may be integrated with the M2M device application by utilizing the CMM API 152. FIG. 1C illustrates a method for integrating the CMM 150 with the M2M device application by utilizing the platform-independent CMM API 152. The integration steps include in step 190 embedding a CMM API.h file in the M2M wireless mobile application 160 source code. This file contains all of the type definitions and function prototypes that will need to be referenced. In step 192 embedding a call back function in M2M wireless mobile application 160 source code. This function will be called by the CMM 150 whenever information is available. All data is delivered asynchronously using this mechanism. Network initiated connection requests are also communicated using the call back. The M2M application 160 source code must complete the connection operations by calling CMM 150 in response to these notifications. In step 194, initializing the CMM 150 by adding a call to CMM Open( ). In step 196, utilizing the API 152 to connect, disconnect, request information, or send SMS messages. In step 198, Calling CMM Close ( ) to release the resources used by the API 152.

The CMM 150 interfaces with the M2M mobile device application 160 through the API 152. The API 152 is a platform-independent interface consisting of methods for connecting, disconnecting, querying parameters, and sending SMS messages. The API 152 allows an M2M developer to design and implement a M2M mobile device application utilizing existing operating systems such as Windows CE, VxWorks, MeeGo, and QNX, etc. In one embodiment, M2M mobile applications 160 written in C or C++ can utilize the API 152 directly. In another embodiment, a wrapper may be created for M2M mobile applications 160 written in other program language in order to utilize the API 152. The API 152 sends information to the M2M application 160 through an asynchronous notification mechanism. The API 152 may send the information synchronously as well. The M2M application 160 registers a call back function and the CMM 150 calls this function any time there is information to communicate. This mechanism is used to deliver status messages from the CMM 150, connection status information, and mobile terminated SMS messages.

The CMM 150 drives the wireless module 110 using all necessary AT commands and responses. In addition, CMM 150 provides and executes logic to handle the various wireless module 110 and network error situations in ways that are compatible with the wireless network.

The CMM 150 ensures that the M2M device connects to the wireless network when necessary and stays connected. The CMM 150 manages intelligent re-tries when there are network related problems, selecting alternative networks when needed.

The CMM 150 may also enable alternative network selection in regards to international roaming which may be inherently less reliable than a native service. In particular, there is the so-called "stuck SIM" problem, an inherent weakness of GSM that can allow a device to remain on a network that can provide GSM service, but is temporarily unable to provide GPRS service. In this situation, the CMM 150 may ensure that an alternative network is selected and significantly improve the reliability of international roaming.

The CMM 150 also provides a valuable diagnostic function. The CMM 150 monitors the quality of wireless communications and makes the information available on demand for diagnostics purposes. The CMM 150 remotely monitors performance of network data connections, checks for errors, and checks the signal strength at the device.

The CMM 150 provides the ability to remotely cause the wireless device to connect or disconnect. Control Center 180 may also be used to initiate a connect or disconnect by sending SMS messages to CMM 150. CMM 150 may use the call back mechanism to notify the wireless application 160 of the request and the wireless application may complete the request by making API 152 calls to CMM Connect or CMM Disconnect.

The CMM 150 maintains log files that record the activity of the CMM 150. These log files may be uploaded and viewed in Control Center 180. Control Center 180 may initiate the request to upload the logs by sending an SMS message to CMM 150. Upon receiving the SMS message, CMM 150 may establish an IP connection via the wireless data network, upload the log files to Control Center 180 and then disconnect.

Figure 2:
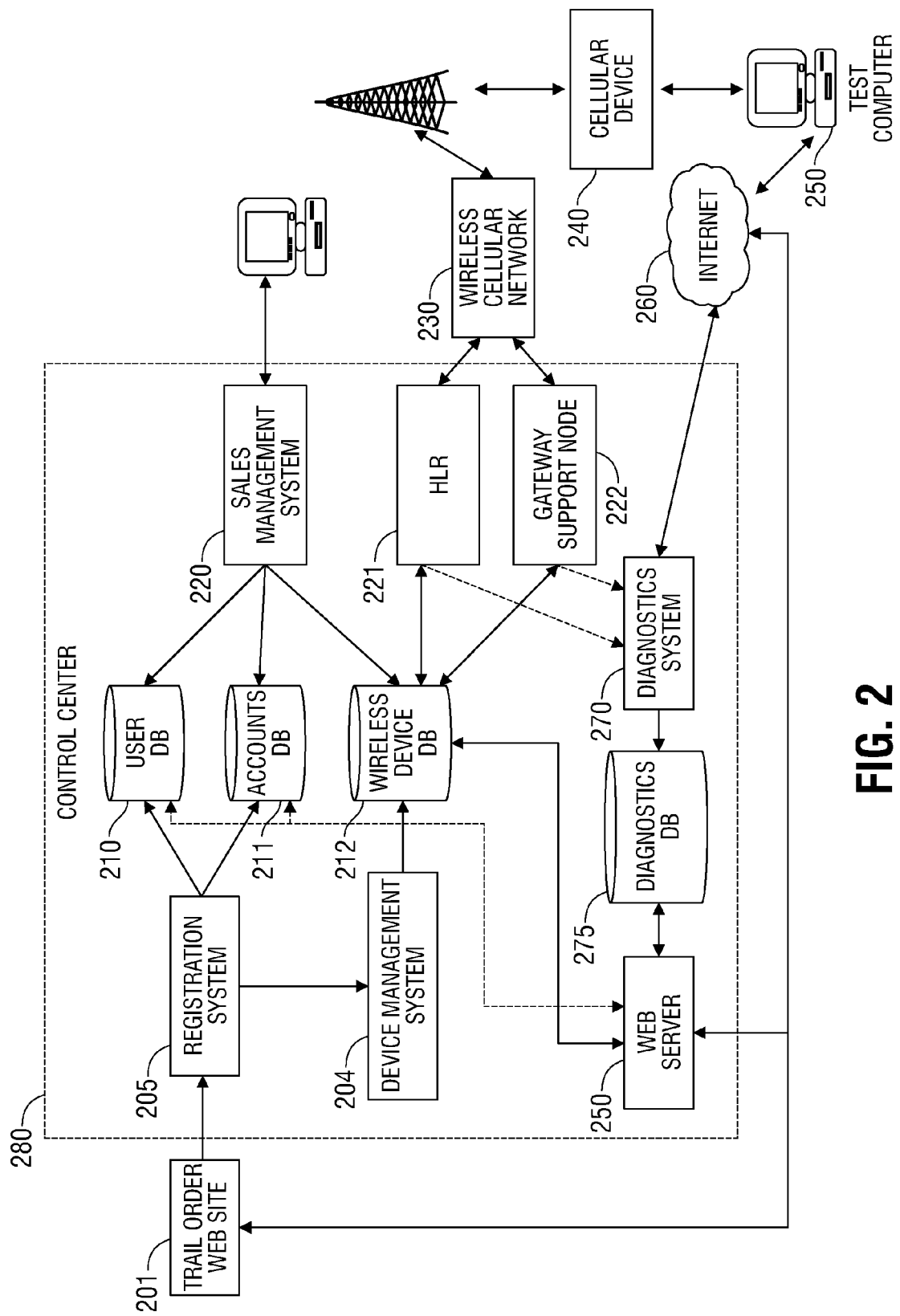
FIG. 2 illustrates a system architecture according to one embodiment of the invention.

A system architecture according to one embodiment of the invention is illustrated in FIG. 2. In this embodiment, a Control Center 280 (such as Control Center 180 of FIG. 1) is communicatively coupled to a test computer 250 over a wireless network 230 operated by a wireless service provider. The Control Center 280 may also be coupled to the test computer 250 through an Internet connection 260, if one is available. This Internet connection is sometimes referred to below as a "direct channel" between the Test Computer and the Control Center 280. The Control Center 280 includes a plurality of servers for implementing the various functional modules 204-205, 220-222, 270 illustrated in FIG. 2 (e.g., by executing program code designed to perform the various functions). The Control Center 280 also includes a plurality of databases 210-212 for storing data related to users and wireless devices.

In one embodiment of the invention, a prospective wireless data customer or M2M developer visits a trial order Website 201 and requests trial SIMs through a Web-based user interface, certain embodiments of which are illustrated in FIGS. 6a-b. As shown in FIG. 6a, the Web-based user interface includes a drop-down menu 601 containing a selectable list of wireless modules supported by the wireless service provider.

In the illustrated embodiment, the service provider may be AT&T and the wireless modules include those wireless modules supported on the AT&T data network. For example, wireless modules may include a Cinterion MC55i, a Telit GE-865, a Sierra Q2426, etc. However, the underlying principles of the invention are not limited to any particular service provider. Other information entered in the Web-based user interface include contact information 602 (user name, address, etc.), account information 603 (for specifying a user name and password for a new user account), a referral code 604, payment information 605 (e.g., credit card data), billing information 606, and shipping information 607. In one embodiment, the Website 201 includes data verification logic to ensure that the data entered in the various data fields is in the correct data format. In addition, although not shown in the figures, the trial order Website 201 includes a connection to a credit card issuer system to verify the credit card payment information entered by the user.

While various different platforms may be used to implement the trial order Website (and other Web-based user interface features described herein), in one embodiment, the Website is an Apache Tomcat web server running on Linux with software programmed in Java using an Oracle database.

Upon entering all requested information, the Website 201 verifies the transaction and transmits the user and device data to a registration system 205. In one embodiment, the registration system 205 exposes an Application Programming Interface (API) to the trial order Website 201 and the trial order Website communicates data to the registration system using the API. The interactions between the Web site and the registration system may be formatted as a Web services-based transaction, with user data embedded in one or more Extensible Markup Language ("XML") files using the SOAP protocol. However, various other data communication protocols may be employed while still complying with the underlying principles of the invention.

In response to receipt of the user data, the registration system 205 establishes a new user account and executes a series of database operations to open new record(s) in a user database 210 and an accounts database 211. For example, the user's name and contact information may be stored in the user database 210 and a new account may be opened for the user in the accounts database 211 (including an account number, wireless device identification codes, etc.). In one embodiment, the various databases shown in FIG. 2 are not actually separate databases but, rather, separate data structures (e.g., tables) within a single relational database.

In one embodiment, a device management system 204 automatically provisions trial SIMs on behalf of the user/developer within a wireless device database 212. As part of the provisioning process, an identification code for each trial SIM is automatically associated with data services offered by the wireless service provider. Each SIM includes a unique serial number, international unique number of the mobile user ("IMSI"), security authentication and ciphering information, temporary information related to the local network, a list of services to which the user is provided access and password data. In one embodiment, the SIMs are initially provisioned with limited "trial" functionality for application development and testing purposes.

For example, in one embodiment, data transmission thresholds are set to limit the amount of data which the trial SIMs may utilize during the testing period. In addition, in one embodiment, the SIMs are provisioned to operate only for a specified trial period. At the end of the trial period, the SIMs are automatically disabled and/or de-provisioned and will no longer be permitted access to the wireless service provider network.

As part of the provisioning process, the SIMs are automatically registered with the Home Location Register ("HLR") 221 of the wireless service provider of wireless network 230. An HLR is a central database containing details of each mobile data subscriber authorized to use the wireless network 230. While the HLR 221 is illustrated in FIG. 2 within the domain of the Control Center 280, in one embodiment, the HLR 221 communicates with a central HLR maintained by the wireless service provider. Alternatively, in one embodiment, the entire HLR is maintained by the service provider and the service provider is provided access to the data stored within the wireless device database 212 during the provisioning process. The underlying principles of the invention are not limited to any particular HLR/database configuration.

Following the automatic provisioning of the trial SIMs and registration of the user, the owner/operator of the Control Center 280 may send a wireless M2M development kit to the user containing the trial SI Ms and an M2M test device with application software for testing and configuration.

In an alternative embodiment, the owner/operator of the Control Center 280 may provide access to application software/middleware such as the CMM 150 shown in FIG. 1A for testing and configuration specifically designed for a user/developer who wishes to implement his/her own M2M test device. In this case, the user/developer may be utilizing any wireless module (i.e. wireless module 110) supported on the service provider's data network. Whether the M2M test device is provided by the wireless service provider to the user/developer with preloaded application software for testing and configuration or whether the user/developer acquires the application software/middleware in the form of CMM 150 for his/her own M2M test device, the principle operation of the various embodiments of the invention are similar. The acquisition of the CMM 150 as an alternative embodiment will be further described below.

Figure 3:
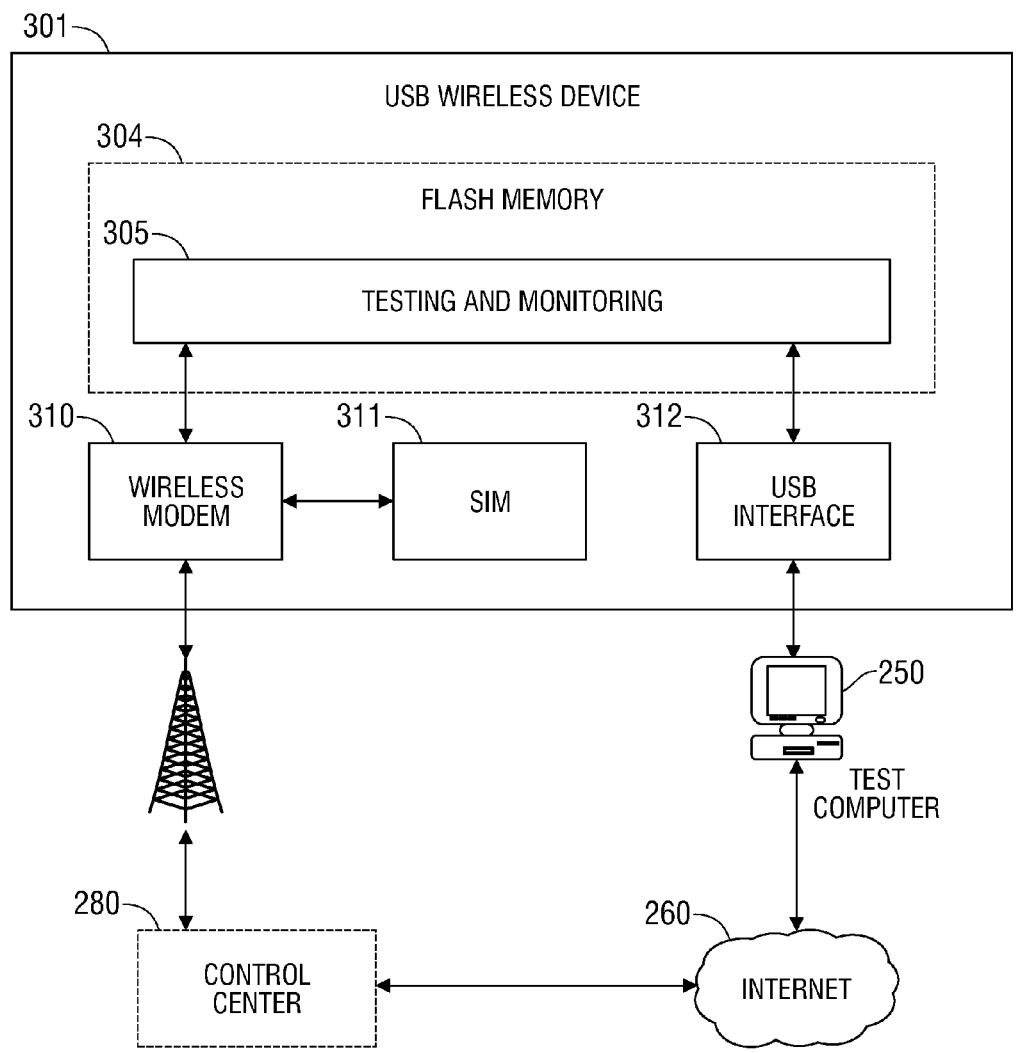
FIG. 3 illustrates one embodiment of a USB test device sent to prospective customers.

As illustrated in FIG. 3, one embodiment of the test device comprises a wireless device 301 with a Universal Serial Bus ("USB") interface 312 for connecting to the USB port of a standard computer system 250. However, the underlying principles of the invention are not limited to any particular interface type. Other interface types which may be used in lieu of USB include, by way of example and not limitation, IEEE 1394b ("Firewire") and eSATA. In one embodiment, the computer system 250 is a Windows-based computer with an Intel® Core-2 Duo®, Core i7®, or similar x86-based processor, 2-4 GBytes of DDR2 or DDR3 memory, and a 250 GByte (or larger) Serial ATA hard drive. Various other computer configurations may also be used while still complying with the underlying principles of the invention. For example, in one embodiment, the test computer 250 is a Macintosh® computer system such as a Macbook Pro® or Mac Pro® desktop. Reference will be made to USB wireless device 301, however, the following description may be applicable to any cellular device, wireless device, or M2M device with any applicable interface types.

One embodiment of the wireless USB device 301 includes a flash memory 304 for storing testing and monitoring program code 305. Alternatively, flash memory 304 may store CMM 150. The flash memory 304 may be integrated directly within the device or may take the form of a memory card coupled to a memory card slot within the USB device (e.g., a Secure Digital card slot). In one embodiment, the USB device 301 includes a wireless modem module 310 pre-configured to communicate over the wireless network and a SIM interface into which the pre-provisioned trial SIMs may be connected for configuring, testing and debugging wireless applications. Once inserted into the SIM interface, the SIM card 311 authorizes the wireless USB device 301 (hereinafter wireless device 301) to communicate over the wireless service provider's network 230 (according to the provisioning parameters associated with the SIM card). In one particular embodiment, the wireless device 301 is a Sierra Wireless Compass 885 or 888 which include a wide-area modem for 7.2 Mbps for HSPA networks. Information related to these devices can be found at http://www.sierrawireless.com/.

In one embodiment, when the wireless device 301 is coupled into the USB port of the test computer 250, auto-installation logic (e.g., an automatic installation script) is executed and (upon authorization by the end user), the testing and monitoring program code 305 or equivalent functionality of CMM 150 is automatically installed and executed on the test computer 250.

In one embodiment, the wireless device 301 (or equivalent functionality of CMM 150) is preconfigured with the Access Point Name ("APN")—i.e., the network address used to identify a Gateway GPRS Support Node ("GGSN") 222 at the Control Center 280. During the testing and configuration process, all wireless cellular communication with the Control Center 280 is routed through the GGSN 222. In addition to the APN, the wireless device 301 (or equivalent functionality of CMM 150) is also configured with the hostname of the Control Center diagnostics system 270, which includes one or more test servers used for IP traffic testing.

In one embodiment, the provisioning parameters for each SIM includes a communication profile specifying the wireless services allocated to the SIM (e.g., whether Short Message Service ("SMS") or voice functionality are permitted, roaming restrictions, etc.). The provisioning parameters also include the rate plan associated with the SIMs including the financial parameters (i.e., the price), the amount of data permitted under the financial parameters, overage rates, etc. As previously described, in one embodiment, each trial SIM is allocated a limited amount of data usage for testing and troubleshooting purposes, and is not provided with voice or SMS communication services. In one embodiment, even though the SIM is not provisioned for voice service, the SIM is provided with GSM functionality in order to be authorized with GSM network, prior to connecting to the GPRS network.

As mentioned above, the testing and monitoring program code 305 or equivalent functionality of CMM 150 automatically establishes a connection with the Control Center 280 over the wireless cellular network 230 and/or a direct channel through the Internet 260 and executes a series of automated tests, thereby saving the end user/developer a significant amount of time and effort in the process of developing new wireless applications. Moreover, because the SIMs received by the end user/developer are pre-provisioned and the USB device (or equivalent functionality of CMM 150) is pre-configured by the Control Center 280, the cellular device 240 is capable of establishing a wireless connection with minimal effort on the part of the prospective customer.

Figure 4:
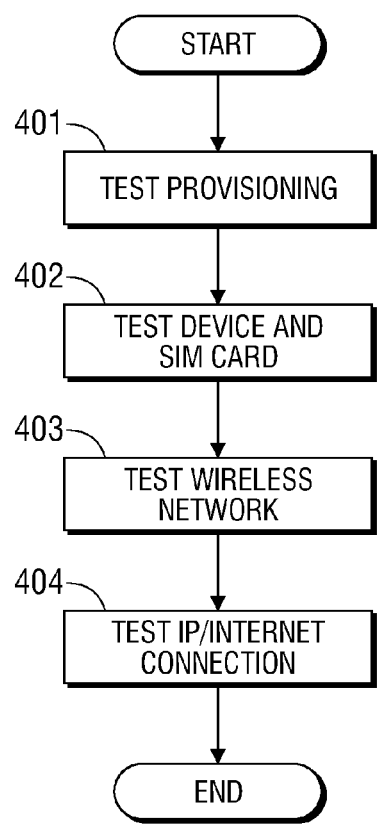
FIG. 4 illustrates a computer-implemented method for connecting, configuring and testing wireless devices.
Figure 5A:
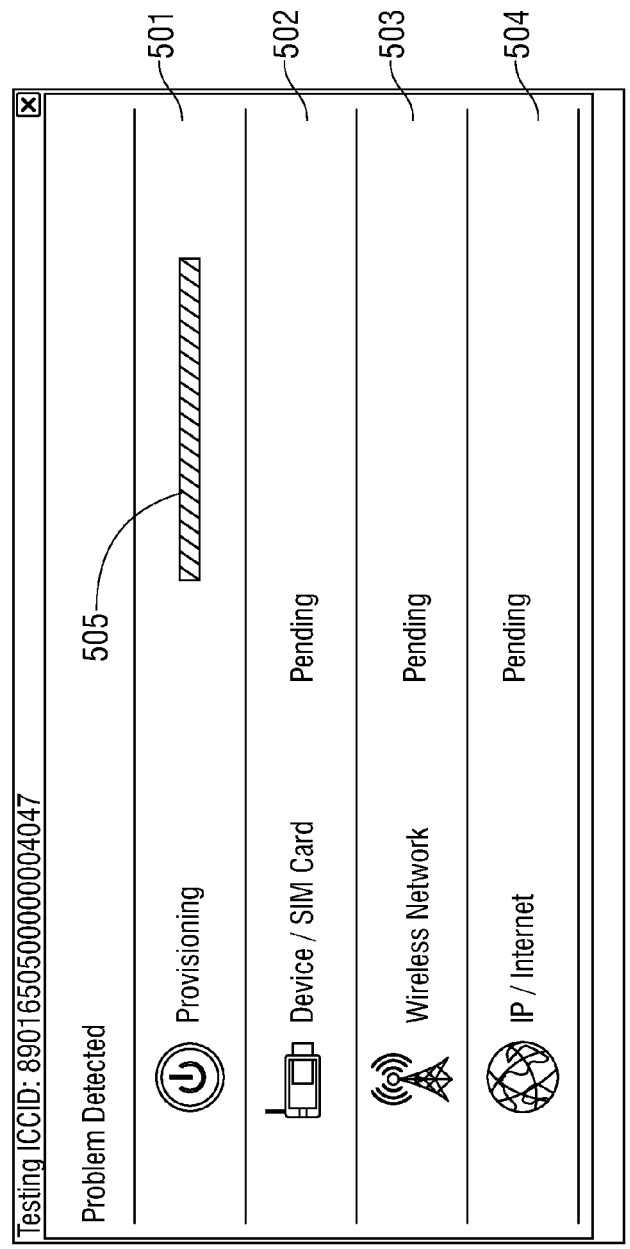
FIGS. 5a-b illustrate one embodiment of a graphical user interface for connecting, configuring and testing wireless devices.
Figure 5B:
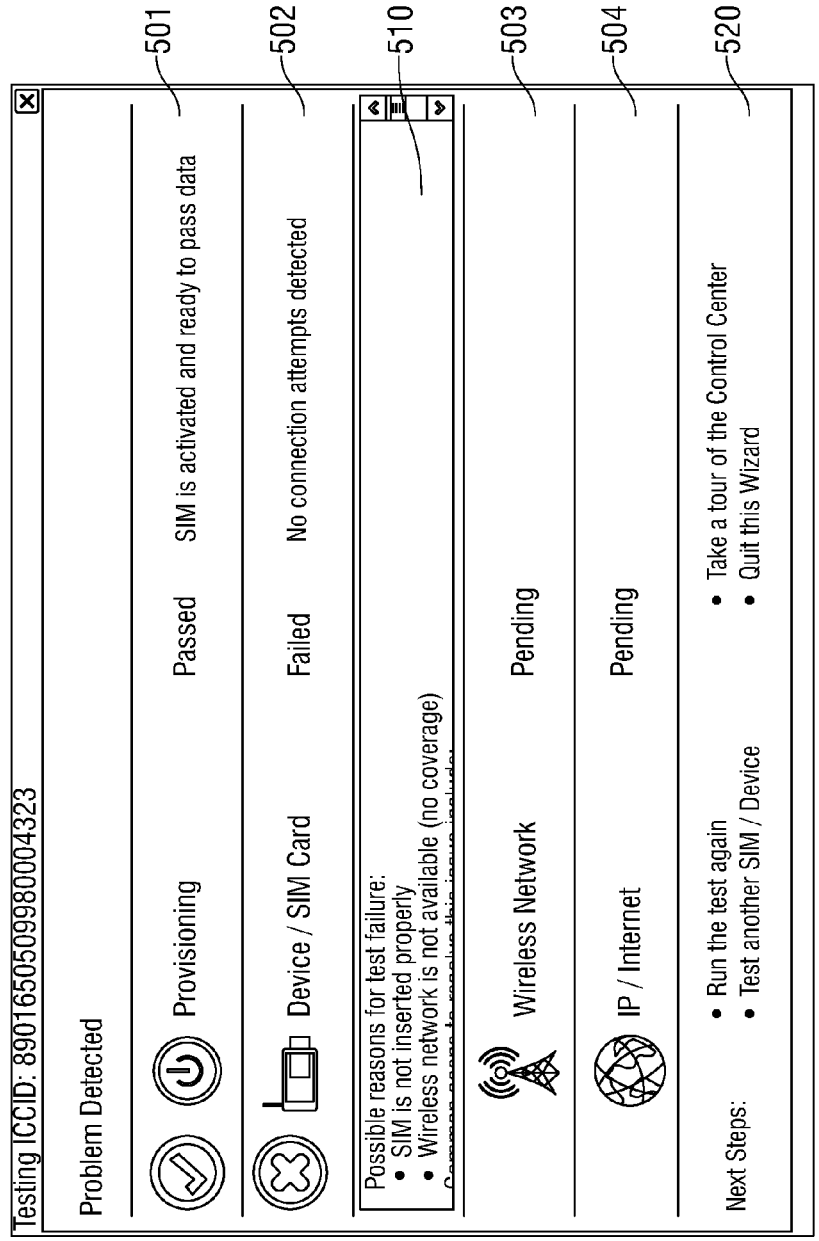

One embodiment of a computer-implemented method for testing, monitoring, and debugging the wireless device 301 is illustrated in FIG. 4 and a series of screenshots of a graphical user interface ("GUI") employed by the testing and monitoring program code 305 is illustrated in FIGS. 5*a-b*.

Turning initially to the method of FIG. 4, at step 401 the testing and monitoring program code 305 (or equivalent functionality of CMM 150) tests the provisioning of the wireless device 301 with a particular trial SIM installed. In one embodiment, this involves checking the following parameters to determine whether traffic is allowed using the given SIM: (a) the SIM's status must be "Activation Ready" or "Activated;" (b) the SIM must not have been blocked due to excessive signaling activity; and (c) the SIM must not have been blocked due to excessive data usage beyond user-defined overage limits.

Assuming that the foregoing conditions are met, the wireless device 301 with the SIM passes the provisioning test step 401. A test failure indicates that one or more of the foregoing conditions were not met. For example, if the SIM's status is not "Activation Ready" or "Activated," or if the SIM has been blocked due to excessive signaling or excessive data usage, then the wireless device 301 with the SIM will fail the provisioning step 401. In response, one embodiment of the testing and monitoring program code (or equivalent functionality of CMM 150) performs troubleshooting operations to fix the problem and/or notifies the user/developer of troubleshooting steps to be taken. For example, if the SIM's status is not "Active" or "Activation Ready" then the testing and monitoring program (or equivalent functionality of CMM 150) may check to ensure that the SIM's status is correctly reflected in the wireless device database 212.

In one embodiment, CMM 150 utilizes the Rules Set Module 156 that provides connection logic that controls the wireless module/modem 110/310. Rules sets may be created, revised, updated, and tested and can be distributed remotely by various means, including generation and distribution by the Control Center platform 180/280.

The Rules Engine Module 154 including the configurable state machine may be configured by rules set files that direct the wireless module 110/310 in setting up and maintaining connections. Rules sets may be maintained and distributed from Control Center 180. Control Center 180 may create rules sets specific to each of the major wireless modules. A collection of rules in the rule set drives the state transitions either unconditionally or in response to events. Events are raised based on wireless module 110/310 responses, connectivity changes, and the action of various timers and counters defined in the rules set. Outputs specified on state transitions result in AT commands to drive the behaviour of the wireless module 110. FIG. 1C illustrates the example rules set according to an embodiment of the invention.

At step 402, the testing and monitoring program code 305 (or equivalent functionality of CMM 150) tests the wireless device and trial SIM. In one embodiment, this test involves determining whether the given USB device and SIM are available on the network based on one of two factors (whichever comes first): (a) reporting from the device via "direct channel" diagnostics, or (b) any detected wireless signaling activity. With respect to (a), the direct channel comprises the direct connection of the test computer 250 to the diagnostics system 270 through the Internet 260.

In one embodiment, the testing and monitoring program code 305 (or equivalent functionality of CMM 150) reports its status to the diagnostics system 270 periodically through the direct channel. These reports may include local wireless statistics such as signal strength and data usage. If the device is unable to connect wirelessly due to lack of coverage or low signal strength, the direct channel provides valuable diagnostic information that would otherwise be unavailable to the diagnostics system.

If a direct channel connection or wireless connection are detected, then the wireless device and SIM pass the device/SIM testing step 402 illustrated in FIG. 4. In one embodiment, if neither connection is detected, then troubleshooting steps are implemented including instructing the user/developer to confirm that the SIM card 311 is inserted properly and determining whether wireless coverage exists at the test location. For example, in one embodiment, the Control Center 280 and/or the testing and monitoring program code 305 (or equivalent functionality of CMM 150) maintains a database of service coverage locations. If the current location of the wireless device is outside of the coverage location, then the testing and monitoring program code 305 (or equivalent functionality of CMM 150) may notify the user that coverage is not available at the current location. The user's current location may be determined manually (e.g., by requesting the current address or zip code for the user) or automatically (using GPS if the user's test computer is equipped with GPS capabilities).

The user may also be asked to verify that the wireless device 301 has adequate signal strength (e.g., greater than 1 bar or a RSSI of 5 or more); verify that the device's antenna is properly connected; verify the wireless device 301 is configured with the proper frequency bands (850 & 1900 MHz for the US, and 900 & 1800 MHz for Europe); and/or verify whether other wireless devices (e.g., GSM/GPRS cell phones) in the proximity are working. Upon verification of one or more of the above variables, the testing and monitoring program code 305 (or equivalent functionality of CMM 150) may re-execute step 402 in FIG. 4 to re-test the USB device/SIM card.

At step 403, the testing and monitoring program code 305 (or equivalent functionality of CMM 150) tests the wireless device's wireless network connection. In one embodiment, this involves checking the Home Location Register 221 to determine whether there has been any recent wireless signaling from the wireless device 301. There are three types of wireless signaling which may be detected: a GSM authorization request; a Mobile Switching Center ("MSC") Location Update; and/or a Serving GPRS Support Node ("SGSN") Location Update. The presence of any of these signaling events indicates that the device has successfully registered on the GSM (voice) network and/or the GPRS (data) network. As such, if any of these signaling events are detected, the testing and monitoring program code 305 (or equivalent functionality of CMM 150) indicates that the wireless device has passed the wireless network testing step 403 in FIG. 4.

If none of these signaling events are detected, then the testing and monitoring program code 305 (or equivalent functionality of CMM 150) may initiate one or more troubleshooting operations. For example, in one embodiment, the Control Center 280 may transmit an SMS message to the wireless device 301. If the SMS message is successful, then GSM service is available (but perhaps not the GPRS service). In addition, the testing and monitoring program code 305 (or equivalent functionality of CMM 150) may check the GSM and GPRS registration using AT commands sent to the wireless modem 310 (e.g., to verify GSM registration, the "AT+CREG?" command should return "+CREG:x,1" or "+CREG:x,5"; where "x" is 0, 1 or 2; to verify GPRS registration, the "AT+CGATT?" command should return "+CGATT:1" and "AT+CGREG?" should return "+CGREG:x,1" or "+CGREG:x,5"; where "x" is 0, 1 or 2). Finally, the testing and monitoring program code 305 (or equivalent functionality of CMM 150) may perform a soft reset of the wireless device 301 or the end user may be prompted to perform a hard reset of the wireless device 301.

Returning to FIG. 4, at step 404, the testing and monitoring program code 305 (or equivalent functionality of CMM 150) tests the IP/Internet connection of the wireless device 301. In one embodiment, this test includes two parts:

(a) Checking the Gateway GPRS Support Node ("GGSN") to determine whether the wireless device 301 has initiated a Packet Data Protocol ("PDF") session. PDP session context data will be present in the Gateway GPRS Support Node (GGSN) when the wireless device 301 has established an active session. Consequently, the existence of a PDP session data indicates that the device was able to resolve the Access Point Name ("APN") to a GGSN and start a PDP session with that GGSN.

(b) Running test traffic from the wireless device 301 to a Control Center test server within the diagnostics system 270 and checking the GGSN for real-time IP traffic statistics. This test fails if the device has no upload/download bytes at all (which suggests a problem with the USB device's IP capabilities) or if it has upload bytes but no download bytes (which suggests a problem reaching the test server).

Assuming that the above conditions are met, the testing and monitoring program code 305 (or equivalent functionality of CMM 150) confirms that the wireless device 301 has passed the IP/Internet test step 404. If these conditions have not been met, the possible reasons include: the APN is not configured properly; the USB device is unable to open ports or sockets; the IP address is incorrect; and/or the IP data cannot flow bi-directionally.

In one embodiment, the testing and monitoring program code 305 (or equivalent functionality of CMM 150) automatically performs the following troubleshooting operations and/or instructs the user/developer to manually perform these operations:

(a) Check whether the whether device 301 has been configured with the correct APN.

(b) Verify that all sockets and ports on the wireless device 301 are closed and free to use.

(c) Verify that the destination IP address programmed in the wireless device 301 is accurate.

In one embodiment, the results of all of the foregoing tests and troubleshooting steps are stored within a diagnostics database 275. If necessary, the results may be reviewed by personnel within the Control Center 280 to provide guidance to the prospective customer when troubleshooting new wireless applications. In one embodiment, local environment statistics are transmitted to the diagnostics database 275 such as wireless signal strength of the trial device. The local environment statistics (and other test data) are then usable for performing diagnostics for the trial device and/or aggregated across different trial devices to construct an estimate of the conditions in a given geographical area.

One embodiment of the invention is implemented on an independent, stand-alone wireless device such as a Windows Mobile device. Alternatively, embodiments of the invention may be implemented on a cellular telephone, a smartphone with data transfer and messaging capability, a tablet computer, a personal digital assistant (PDA), a video-camera, a gaming device, a global positioning system (GPS), an e-Reader, a Machine-to-Machine (M2M) device (i.e., an application-specific telemetry device that collects data using sensors and transmits the data to a destination such as a server over a network), a hybrid device with a combination of any of the above functionalities, or any other wireless mobile devices capable of sending and receiving voice, data and text messages. In these embodiments, the trial SIM may be installed and the testing and monitoring software or CMM 150 may be executed directly on the independent mobile device (e.g., loaded from non-volatile to volatile memory and executed by the mobile device's processor). Consequently, there is no need for an additional computer system in this implementation.

Moreover, in one embodiment, the testing and monitoring software or CMM 150 automatically checks for updates prior to executing the various tests and troubleshooting steps described above. The updates may include patches and additional tests/troubleshooting operations. If an update is available, the testing and monitoring software automatically installs the update (upon confirmation by the end user) and then executes the tests.

FIGS. 5a-b illustrate a graphical user interface ("GUI") employed by the testing and monitoring program code 305 or CMM 150 with graphical elements 501-504 corresponding to steps 401-404 illustrated in FIG. 4. Each graphical element provides an indication of progress of its corresponding step. For example, in FIG. 5a, graphical element 501 corresponding to the provisioning step 401 generates a graphical progress bar to show the progress of the provisioning step.

As each step in the test script is completed, an indication of the results is provided within each graphical element 501-504. For example, in FIG. 5b, a "Passed" indication is provided within graphical element 501 (to indicate that the wireless device passed the provisioning step 401) and a "Failed" indication is provided within graphical element 502 (to indicate that the wireless device failed the device/SIM step 502). In the event that the wireless device fails one of the test steps, a scrollable window 510 is generated within the graphical element corresponding to the failed step to provide troubleshooting information to the end user. For example, in response to the failure of the device/SIM card test, troubleshooting instructions are provided to the end user to help determine the problem.

As illustrated in FIG. 2, one embodiment of the Control Center 280 includes a Web server 250 which dynamically generates a Web-based graphical user interface for monitoring and managing wireless devices which have been added to the system (e.g., following the testing and troubleshooting techniques described above). Using the Web-based GUI, customers and potential customers are provided with comprehensive access to all data stored in the wireless device database 212 and the diagnostics database 275. This information may be used to monitor, manage, and troubleshoot wireless devices. As shown in FIG. 5b, in one embodiment, a link 520 to the Web server is provided in the testing window to provide quick access to the Control Center Web server 250.

Figure 7A:
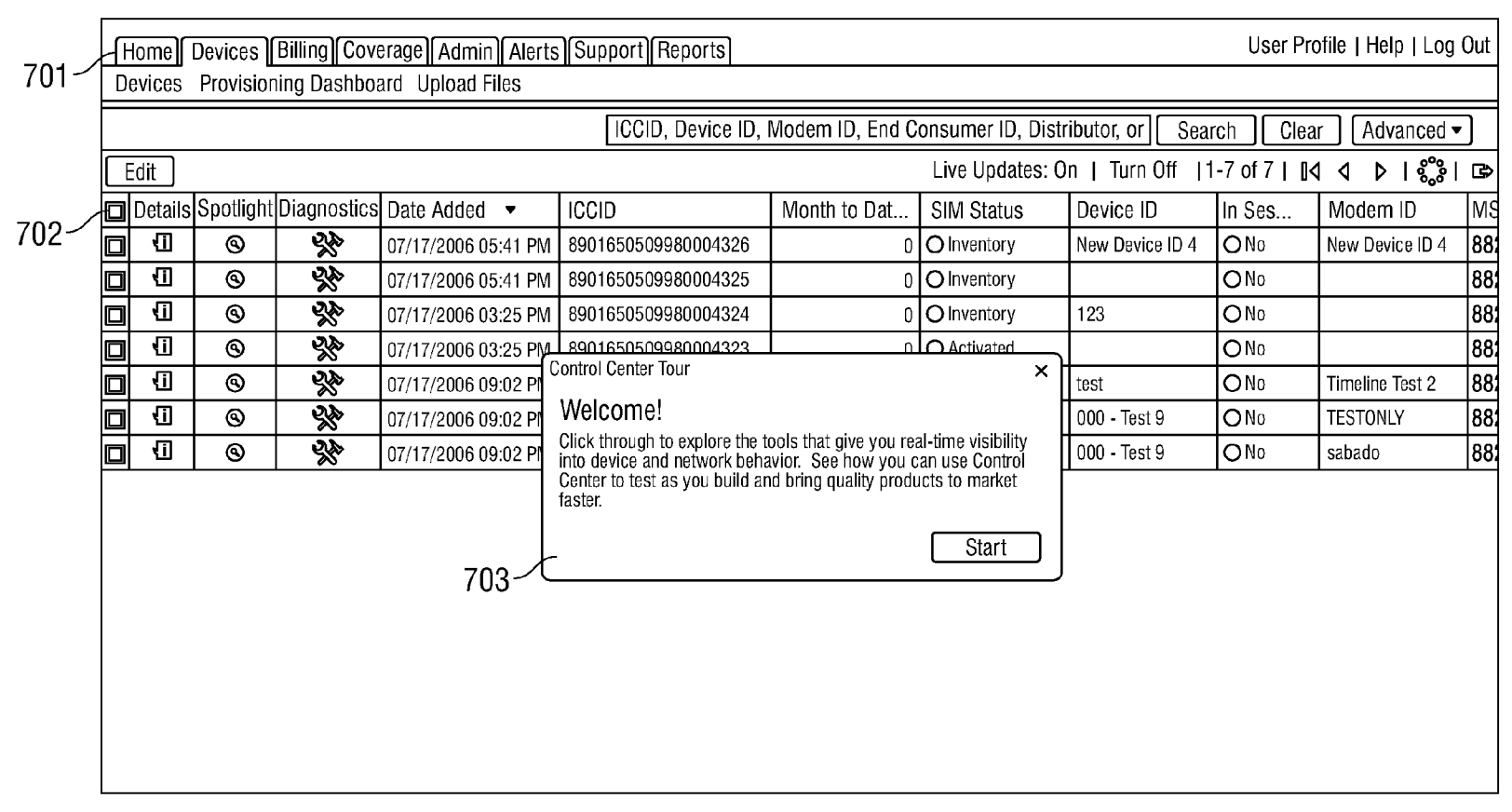
Figure 7B:
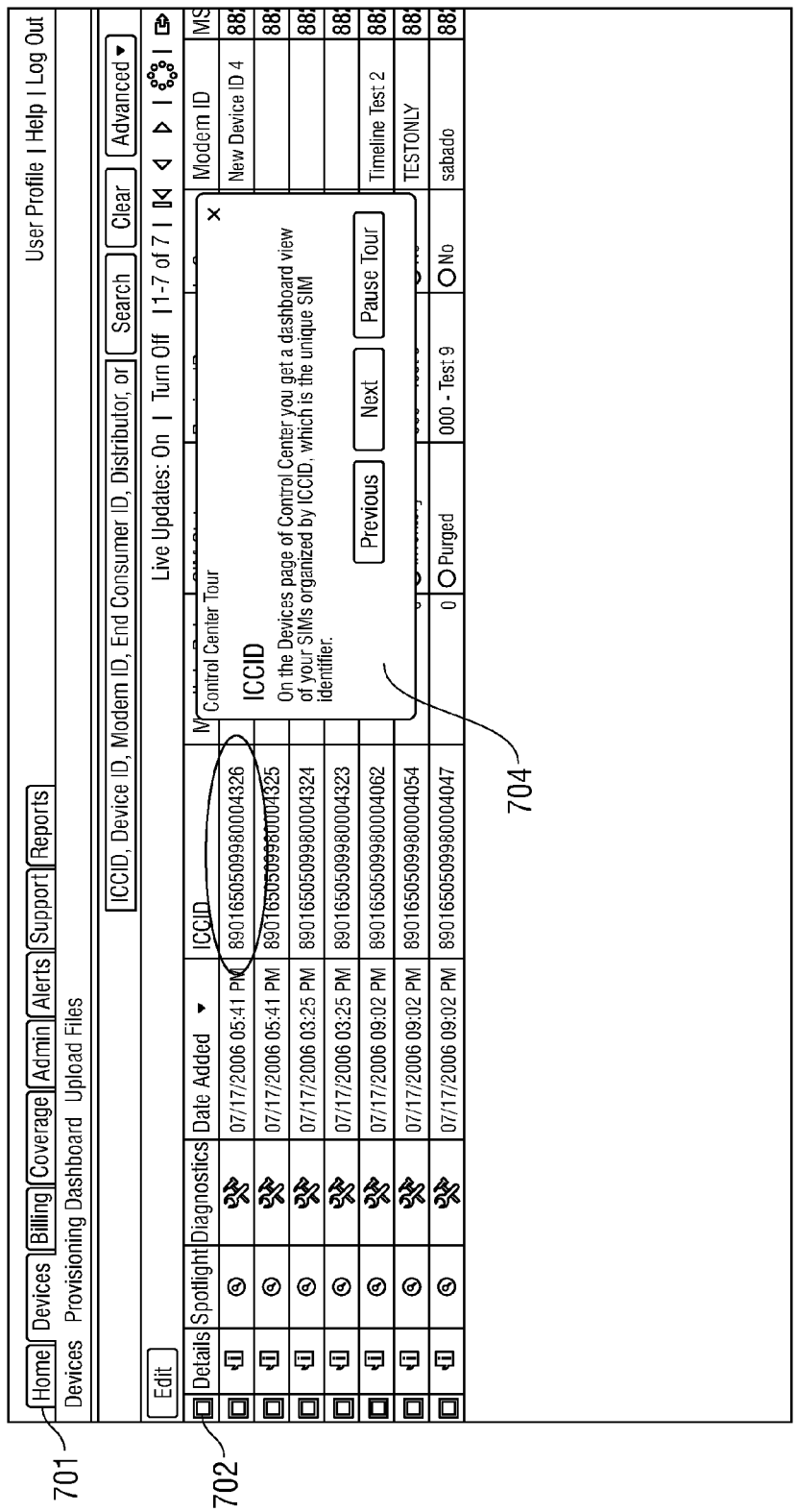
Figure 7C:
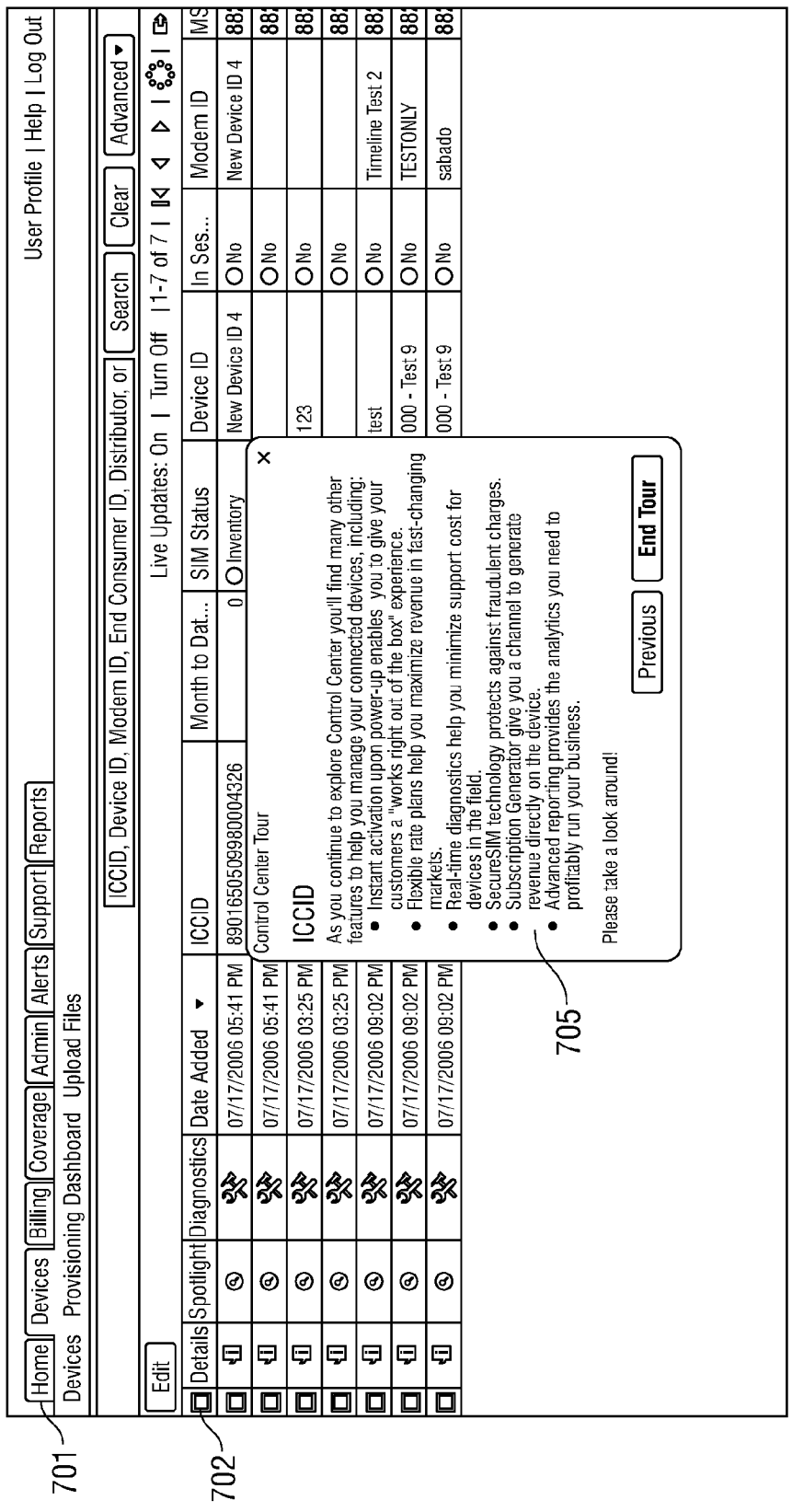

As illustrated in FIGS. 7a-c, in one embodiment, the user/developer is initially provided with a "tour" of the Control Center 280 Website. The tour includes a sequence of informational windows 703-705 identifying various aspects of the Control Center, with certain features of the Control Center GUI displayed behind the informational windows. As shown in FIGS. 7a-c, a series of selectable tabs 701 are provided at the top of the Control Center GUI to enable a customer or potential customer to efficiently identify information related to the customer's wireless devices. In the specific embodiment illustrated, the tabs include wireless devices, billing information, device coverage information, account information, alerts, support, and reports.

In the embodiments show in FIGS. 7a-c, the "devices" tab is selected, thereby generating a table containing information related to each of the customer's wireless devices. Specifically, as indicated in column headings 702, the information includes the SIM identification code for each wireless device ("ICCID"). The status associated with each wireless device (e.g., an indication as to whether the SIM device has been activated), a device ID code, an indication as to whether the device is currently connected to the Control Center, the date each wireless device was added to the system, and a modem ID uniquely identifying the wireless modem 310 used on each device. Links are also provided to provide access to diagnostics for each wireless device and a "spotlight" feature which provides detailed connectivity information for each device (e.g., when and where different connectivity events occurred). The "spotlight" feature is described in Co-Pending patent application Ser. No. 12/387,962, entitled "Virtual Diagnostic System for Wireless Communications Network Systems", filed on May 7, 2009, which is assigned to the assignee of the present application and which is incorporated herein by reference.

Once a trial wireless device is preconfigured and pre-provisioned as described above, a sales management team at the Control Center 280 is provided with access to the user, account, and device databases 210-212 through the sales management system 220 illustrated in FIG. 2. FIG. 8 illustrates a Web-based graphical user interface employed by one embodiment of the sales management system 220 in which a "sales management" tab is provided to access the sales management data. In FIG. 8, the sales management tab is selected, thereby generating a table with each row representing a different account and each column containing different variables associated with each customer or potential customer.

Specifically, as indicated in column headings 802, the information provided under the sales management tab includes the account name and identification code, the lead qualification state (used to classify whether the trial has the potential to become a paying customer—e.g. qualified, unqualified, potential at later date, etc.), the industry of the customer (e.g., boating, ships, retail electronics, fleet management, healthcare, etc.), the device types employed by the customer (e.g., cell phones, M2M devices, etc.), the launch timeframe indicated by the customer, the expected deployment numbers (e.g., number of M2M units), and a referral code. It should be noted that various additional or alternative data may be provided to the sales management team via the graphical user interface while still complying with the underlying principles of the invention.

Figure 9:
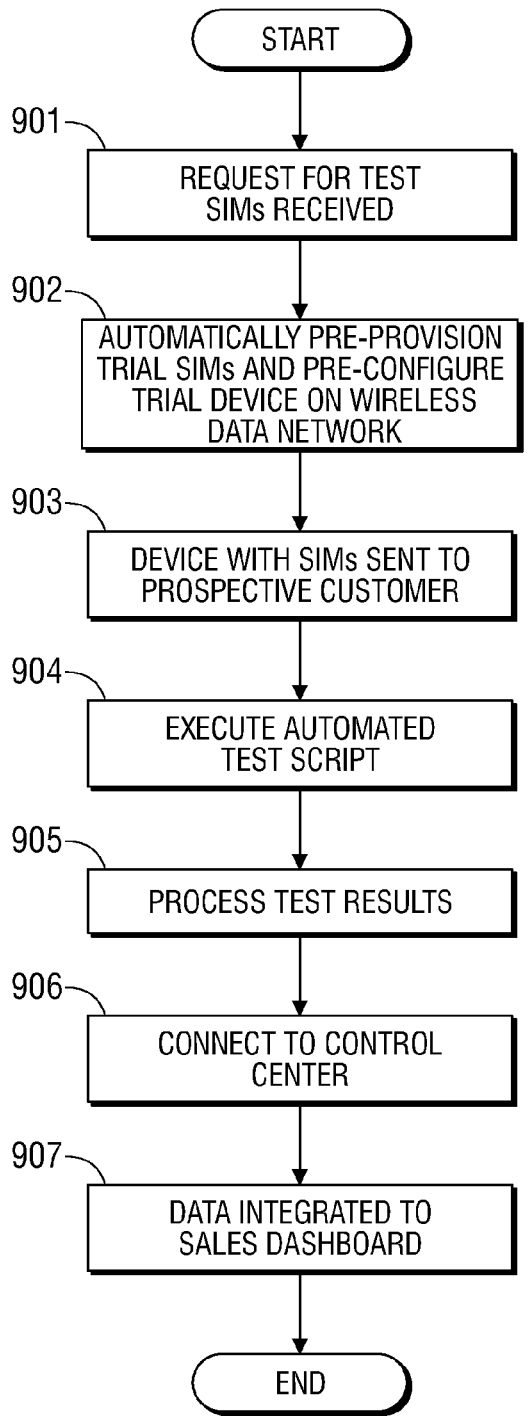
FIG. 9 illustrates one embodiment of a computer-implemented method for establishing new user accounts, testing trial devices and managing user data.
Figure 10:
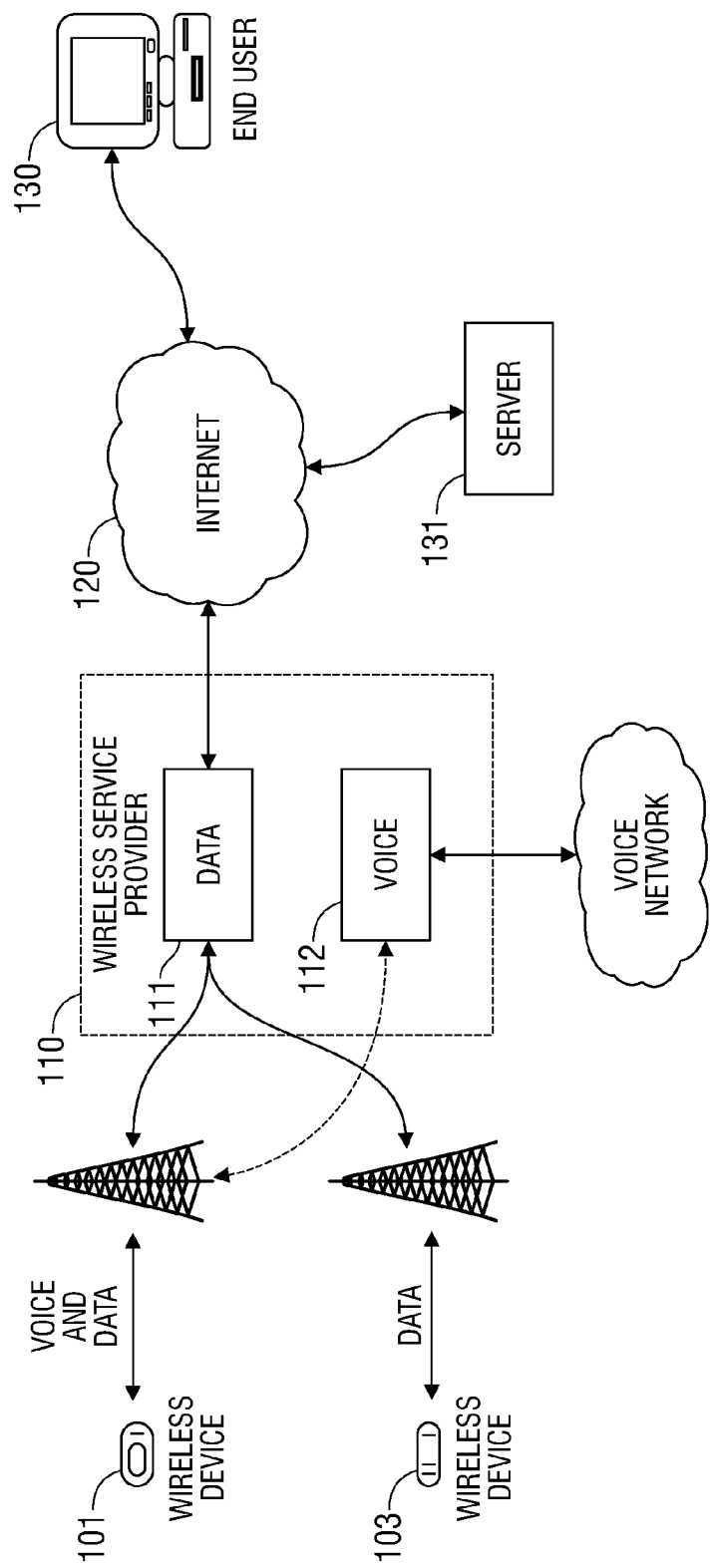
FIG. 10 illustrates a Prior Art high level architecture of a wireless data and voice system.

A computer-implemented method according to one embodiment of the invention is illustrated in FIG. 9. Various aspects of the method have already been described with respect to the system shown in FIGS. 2-3. However, the underlying principles of the computer-implemented method are not limited to any particular system configuration. In fact, the computer-implemented method illustrated in FIG. 9 may be implemented on virtually any computing platform.

As indicated at step 901, a prospective wireless data customer initially requests trial SIMs via a Web-based user interface by entering contact information, billing information and information related to the prospective customer's wireless data requirements. At 902, the SIMs are automatically pre-provisioned and the trial device is pre-configured to operate on the wireless data network. At 903, trial SIMs, hardware, and software are sent to the prospective customer to enable the prospective customer to efficiently develop a wireless data solution. In one embodiment, the trial hardware includes a test device with a computer interface (e.g., a USB interface) and the trial software comprises a testing and monitoring application or CMM 150 configured to be automatically installed and executed when the test device is plugged into the interface of a prospective customer's computer system.

At 904, the test software or CMM 150 executes an automated test script to perform a plurality of tests on the wireless device with a particular SIM installed. In one embodiment, the tests include (1) a provisioning test to confirm that the trial device/SIM are correctly provisioned for the wireless network; (2) a device/SIM card test to test the operation of the trial device and SIM; (3) a wireless network test to confirm operation of the trial device on the wireless network; and (4) an IP/Internet test to test Internet connectivity of the trial device. Details associated with some embodiments of these tests are provided above.

At 905, the test results are processed. In the event of a test failure, various troubleshooting steps may be taken automatically (by CMM 150) or may be proposed to the customer (e.g., as described above). The results of each of the tests are stored within the diagnostics database 275 at the Control Center 280 (assuming that network connectivity to the Control Center 280 exists).

At step 906, the prospective customer/developer is automatically directed to the Control Center Website 250 for a tour of the Control Center. Some embodiments of the Web-based GUI are described above with respect to FIGS. 7a-c. Finally, at step 907, the wireless device data is provided to the sales management team at the Control Center 280 where it may be used to manage data of prospective customers. One embodiment of a Web-based GUI for providing this information to the sales management team is described above with respect to FIG. 8.

In one embodiment, the Web server platform used to implement the Web-based embodiments of the invention is an Apache Tomcat web server running on Linux with software programmed in Java using an Oracle database.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules such as wizards and other logic described herein may be implemented as software, hardware or any combination thereof. Accordingly, the scope and spirit of the invention should be judged in terms of the claims which follow.

What is claimed is:

1. A mobile wireless device operating in a wireless network comprising: a processor; a wireless modem comprising a radio receiver and a transmitter unit coupled to the processor; and a memory coupled to the processor, the memory comprises instructions for a Connection Manager Module (CMM) including an Application Programming Interface (API) module, a Rules Engine Module (REM), and a Rules Set Module (RSM) comprising a first rule set, the first rule set comprises logic to instruct the CMM to control the wireless modem, wherein the CMM comprises software independent of operating system software and mobile wireless device application software, and the CMM manages a connection to the wireless network, the memory is configured to provide the processor with instructions which when executed cause the processor to identify aggressive behavior data contained in at least one data log transmit the aggressive behavior data to a control center server; receive a second rule set to eliminate aggressive behavior from the control center server to store in the RSM; instruct the REM to utilize the second rule set in the RSM to allow the CMM to control the wireless modem to eliminate the aggressive behavior, wherein the CMM comprises attention (AT) commands to control the wireless modem and wherein the operating system software and the mobile wireless device application software do not issue AT commands to control the wireless modem; and receive a disconnect instruction from the control center server if the aggressive behavior persists.

2. The mobile wireless device of claim 1, wherein the RSM comprises a timer that is started by an event and expires after a time out value and wherein a next time out value $T2=C+n*T1$ where C is a constant, n is a multiplier, and T1 is a current time out value.

* * * * *